United States Patent [19]

Angle et al.

[11] Patent Number: 4,738,420

[45] Date of Patent: Apr. 19, 1988

[54] AUTOMOTIVE DASHBOARD RADIO MOUNTING ASSEMBLY

[75] Inventors: Norman R. Angle, Mission Hills; Gregory A. Maas, Tijunga; John Henry, Thousand Oaks, all of Calif.

[73] Assignee: Ampersand, Inc., Chatsworth, Calif.

[21] Appl. No.: 870,486

[22] Filed: Jun. 4, 1986

[51] Int. Cl.⁴ .............................................. G12B 9/00
[52] U.S. Cl. .................................. 248/27.1; 248/544; 248/558; 312/7.1; 455/345
[58] Field of Search .............. 248/27.1, 551, 544, 248/542, 558, DIG. 6; 455/345; 312/7.1

[56] References Cited

U.S. PATENT DOCUMENTS

| | | | |
|---|---|---|---|
| 2,974,918 | 3/1961 | Voigtlander | 248/558 X |
| 3,922,047 | 11/1975 | Tsuji | 312/7.1 X |
| 4,181,282 | 1/1980 | Oliver et al. | 248/542 X |
| 4,462,564 | 7/1984 | Alves et al. | 248/27.1 |
| 4,569,458 | 2/1986 | Horsley | 248/DIG. 6 X |

Primary Examiner—David L. Talbott
Attorney, Agent, or Firm—Nilsson, Robbins, Dalgarn, Berliner, Carson & Wurst

[57] ABSTRACT

A mounting assembly for installing a radio, or equivalent apparatus, in an automobile dashboard. The dashboard mounting assembly is a box-like structure having a first open end through which a radio or equivalent device may be inserted. At least one of the peripheral walls of the assembly is formed with numerous recesses which indicate locations through which apertures are punched out to define locations at which brackets are secured.

14 Claims, 1 Drawing Sheet

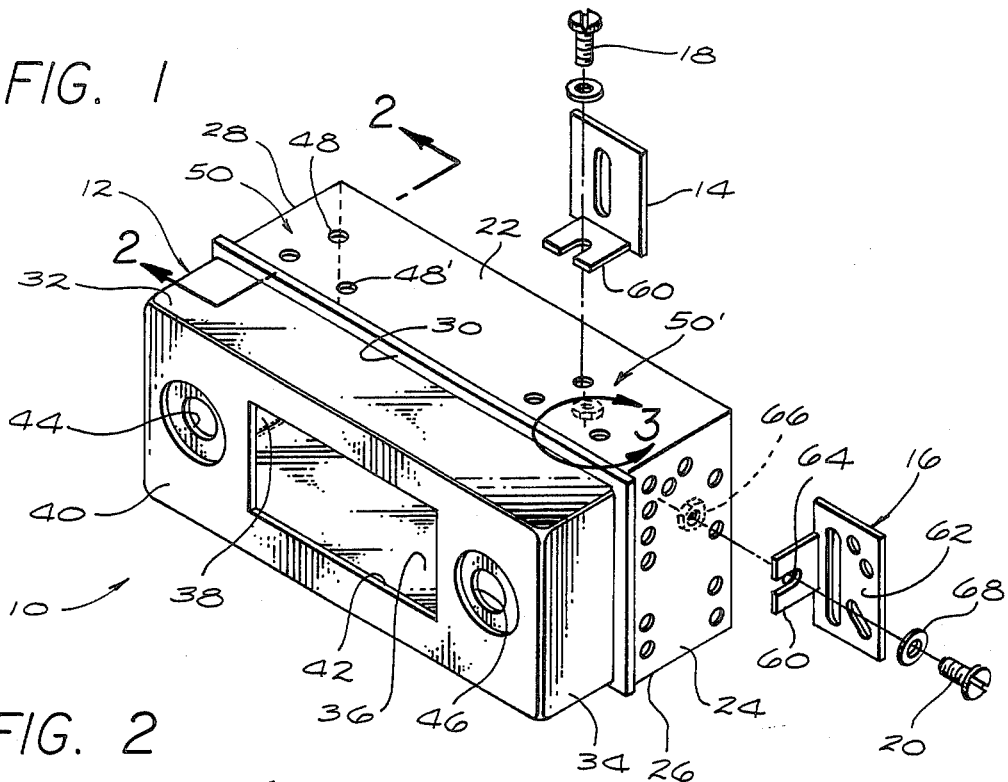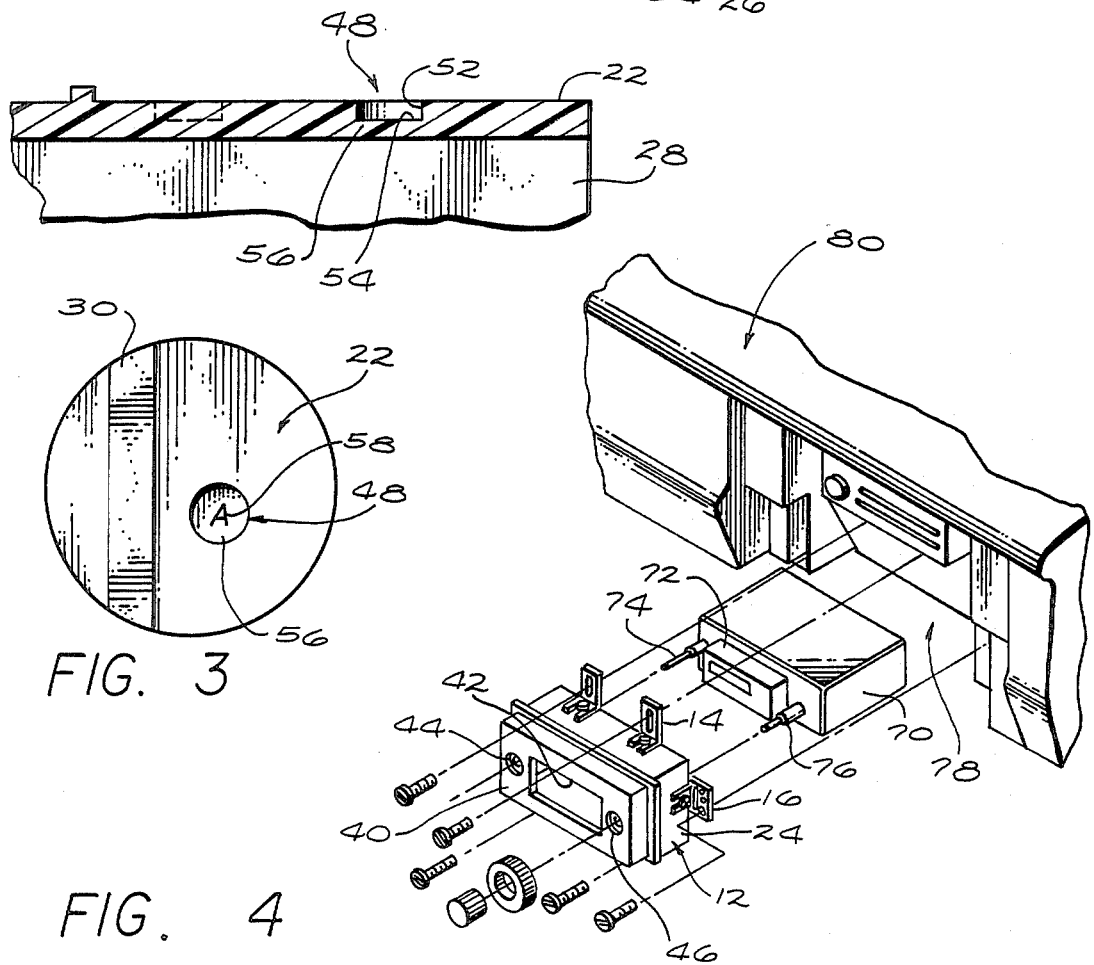

AUTOMOTIVE DASHBOARD RADIO MOUNTING ASSEMBLY

BACKGROUND OF THE INVENTION

The present invention is directed to an assembly for mounting a radio or equivalent apparatus in an automobile dashboard.

It is common today for automobile owners to replace the original automotive radio equipment or to install their own radio into a recently purchased automobile. The radio is installed in a cavity of the automobile dash, typically by means of a mounting frame and bracket assembly. A trim frame is sometimes positioned around the mounted radio contiguous the dash.

The precise dimensions of the automotive dash cavities and the manner for mounting radios differ between various types and models of automobiles. Automobiles manufactured by different companies, and sometimes automobiles from the same manufacturer, are designed with dash cavities for receiving different sized radio mounting assemblies. Thus, when installing a radio in a particular automobile a specific mounting assembly designed for that particular automobile dash cavity must be purchased.

It would thus be highly desirable to provide a mounting assembly which could be used to install radios in different automobiles. While a universal mounting bracket for all makes and models of cars is probably prohibitive, a universal mounting assembly for one particular manufacturer's automobiles or at least a large number of such maker's automobiles would still be beneficial.

A universal mounting bracket for a wide variety of General Motors automobiles, in particular the new General Motors M-2000 series radio chassis, is disclosed in U.S. Pat. No. 4,462,564 issued to Alves et al., July 31, 1984. This particular universal mounting assembly provides a mounting frame having a box-like structure into which the radio is received. The front panel of the mounting assembly is provided with cutouts through which the tuning, volume and other control mechanisms of the radio are positioned. The side walls of the disclosed assembly are provided with a plurality of rearwardly extending slots in which mounting brackets are adjustably secured for facilitating the mounting of the assembly, with the radio, in the dashboard cavity of the automobile.

While this disclosed assembly provides a universal mounting assembly for installing radios in various car models, in particular certain General Motors cars, there are disadvantages in its use. One particular disadvantage involves the securing of the brackets in the mounting frame rearwardly extending slots. The installer must select the proper slot or slots for use with a particular automobile, which is often confusing and difficult with the many slots and many automobiles involved. In addition, the bolts used to secure the brackets in the slots loosen normally over time. These now loosened brackets tend to slide in the slots causing the entire assembly to laterally move in and out of the dash cavity. This movement usually is only eliminated by re-torquing the bolts which requires disassembly of the dash. A further disadvantage is that during installation, and also the re-torquing operation, the precise position of each bracket in the specific rearwardly extending slot is determined by repetitively assembling the various brackets in the slots, inserting the assembly in the dash cavity to determine if the brackets are properly positioned, and, if necessary re-positioning and securing the brackets in the slots. This necessitates an extensive amount of time to determine the precise location for each bracket in each slot.

It thus remains desirable to provide an automotive dashboard radio mounting assembly which is useful for installing radios in numerous types of automobiles and which provides for a simplified installation operation.

SUMMARY OF THE INVENTION

The invention accomplishes the foregoing objectives by providing an apparatus for mounting a radio, or equivalent type device, in a plurality of different types of automobiles. The apparatus includes a frame, which defines a receptacle for receiving the radio to which one or more brackets are bolted. These brackets are bolted to at least a first wall through apertures provided through the wall at predetermined locations for a particular type of automobile.

More specifically, the present invention is directed to a mounting frame means having a front panel connected to four interconnected peripheral walls which defines an open, substantially box-like structure in which the radio is received. The front panel defines at least one cutout through which the controls of the radio are positioned. At least one of the frame walls exterior surface defines a plurality of aperture locator means for indicating the location at which apertures are to be punched through. Bracket means are secured to this frame wall by positioning a fastening means, such as a bolt, through the aperture formed by the installer.

In accordance with a preferred embodiment, the aperture locator means comprises a recess in the wall, which possesses an indicia. The installer punches an aperture through the wall at an appropriately selected recess or recesses as specifically identified for a particular automobile. Brackets are secured to the wall by bolts passed through these apertures.

The use of the aperture locator means reduces the time necessary to properly locate the position at which the brackets are to be secured to the mounting frame. Furthermore, the use of these apertures, as the attachment point, in comparison to an elongated slot, significantly reduces the lateral movement of the brackets, and thus the assembly.

BRIEF DESCRIPTION OF THE DRAWINGS

The present invention may be better understood and its numerous advantages will become apparent to those skilled in the art by reference to the accompanying figures, wherein like reference numerals refer to like elements in the several figures, and wherein:

FIG. 1 is a perspective view of a mounting frame illustrating the attachment of brackets in accordance with one embodiment of the invention;

FIG. 2 is a sectional view of FIG. 1 along line 2—2;

FIG. 3 is an enlarged isolated view along line 3 of FIG. 1; and

FIG. 4 is a perspective, exploded view illustrating the installation of a radio in the dash of an automobile using a mounting apparatus in accordance with one embodiment of the invention.

DESCRIPTION OF THE PREFERRED EMBODIMENTS

The present invention is directed to a mounting assembly for installing a radio, or equivalent device, in an automobile dashboard.

Referring to FIG. 1, a perspective view of a mounting assembly in accordance with an embodiment of the invention is seen generally at 10. The mounting assembly 10 generally includes, a mounting frame 12, to which one or more brackets 14 and 16 are separately mounted by a bolt, as indicated generally at 18 and 20, respectively. The mounting frame 12 is generally a box-like structure having four interconnected peripheral walls 22, 24, 26 and 28 (side walls 26 and 28 shown in phantom) which are secured along a contiguous edge to a front panel 30. The front panel 30, as illustrated, is further secured on the opposite surface to a face panel assembly 31 which is a slightly smaller dimensioned boxlike structure defined by four interconnected peripheral walls 32, 34, 36 and 38 connected to face panel wall 40.

The face panel wall 40 is provided with a substantially rectangular cutaway 42 and two oval cutaways 44 and 46, about which are provided substantially circular recesses 45 and 47, through which the various operating controls of the radio may be positioned. The face panel wall 40 and the respective walls 32, 34, 36 and 38, are preferably provided with an exterior decorative surface. It should be noted that the face panel wall 40 may have any configuration of cut-outs or apertures for receiving the operating controls of various types of radios or other devices, e.g., a large substantially rectangular cut-out for receiving a tape cassette. Furthermore, the peripheral walls 32, 34, 36 and 38 may be of any varying width. It should be noted that the frame 12 need not possess the face panel assembly 31. In place of the face panel assembly 31 the front panel 30 can define the appropriate cut-outs or apertures and, if desirable, be provided with the decorative appearance finish.

One or more of the mounting frame side walls 22, 24, 26 or 28 defines a plurality of aperture locator means 48. These locator means 48 designate where apertures may be punched through the respective side wall. A bracket, such as indicated at 14 and 16, is secured to the respective side wall by positioning a bolt, as indicated at 18 and 20, through a provided aperture. As illustrated, a plurality of aperture locator means 48 are provided in the surfaces of the side walls 22 and 24 at various locations, preferably in groupings, as generally indicated at 50. The precise location of the locator means 48, or of the groupings 50, is dependent upon the number of brackets, and points of attachment to the frame 12 side walls necessary to allow the mounting assembly 10 to be used for installation of radios in a number of different automobiles. The locator means 48 may be defined in any suitable manner or configuration, e.g., any type of indicia marking on the surface of the respective side walls or any shaped depression or recess defined in the surface of the side walls.

Referring now to FIG. 2, a preferred embodiment of the locator means 48 will be described. The preferred locator means 48 is a substantially circular recess formed in a side wall, as defined by a peripheral wall 52 connected at one end to a surface 54. The thickness of the side wall, here side wall 22, contiguous the surface 54 is greatly reduced to define a severable wall 56. This severable wall 56 can be of any desired thickness, and in one embodiment is thin enough to allow it to be easily punched through. The severable wall 56 of the prescribed locator means 48 may be punched through by any suitable means, e.g., by drilling or using a punch or a screw driver. Generally, the installer will select and punch through a number of desired locator means 48 severable walls 56, from provided instructions for a particular automobile, and secure brackets to the wall by passing a bolt through the now provided apertures.

In accordance with a more preferred embodiment, each locator means 48 possesses an indicia 58, as illustrated in FIG. 3, to facilitate the selecting by the installer of the specific locator means 48 to be punched through. The indicia 58 may be of any suitable type, e.g., letters or numbers imprinted upon the surface of a respective side wall of frame 12, or as preferred upon the surfaces 54 of an aperture locator means 48. Typically, each indicia will be different, thus greatly simplifying installation instructions and shortening installation time.

After one or more appropriately selected locator means 48 have been punched through, brackets, illustrated in FIG. 1 at 14 and 16, are secured to the mounting frame 12 using bolts. The brackets 14 and 16 are generally formed from two substantially planar members angularly secured, preferably perpendicularly, together along one edge. A first member of each bracket, designated as 60 and 61 for brackets 14 and 16 respectively, will be positioned against a side wall of the mounting frame 12. This particular first member, 60 or 61, defines a slot 64 or 65, respectively, through which the bolt can be passed to secure the bracket to the side wall at which a locator means 48 has been punched through. As seen in FIG. 1, a nut 66 is threadably secured down upon the threaded end 21 of the bolt 20, inside the frame 12, thus securing the bracket 16 to the side wall 24. A washer 68 will generally be positioned between the head 23 of the bolt 20 and the surface of the leg 61. In this fashion, a plurality of brackets may be mounted to the various side walls of the mounting frame 12.

The second planar member, 62 and 63 of the brackets 14 and 16, respectively, also defines one or more apertures or slots, generally indicated as slots 67 and apertures 69. The assembly 10 is secured to the automobile dash by passing a bolt through an aperture 69 or a slot 67 and then threadably securing the bolt in a threaded receptacle, not shown, provided in the dash. It should be noted that means other than threaded bolts may be used to secure the brackets to the frame and the assembly to the dash.

As seen in FIG. 4, a radio 70 is received in the assembly 10 mounting frame 12, to which various brackets have been secured in the manner described above. The assembly 10, with the radio 70, is mounted in a cavity 78 of an automobile dash 80, as previously described, with a plurality of bolts, shown generally at 82. The radio 70 includes a front projecting portion 72, which passes through the rectangular cutaway 42 of the face panel 32, and two operating stems 74 and 76, which pass through the oval cutaways 44 and 46 of the face panel 32. The specific positioning of the various brackets about the mounting frame 12 is, as discussed above, dependent upon the particular configuration of the cavity 78 of the dash 80 for the particular automobile in which installation is being performed.

The plurality of locator means 48 positioned in the side walls of the mounting frame 12 allows the assembly 10 to be used in mounting radios, or like devices, in various types of automobiles. The difficulty in securing the various brackets to the mounting frame 12 is lessened by the proper positioning of the locator means 48, which preferably are provided indicia, for which the installer is instructed to punch through for a particular automobile.

While the preferred embodiments have been described and illustrated, various modifications and substitutions may be made thereto without departing from the scope of the invention. Accordingly, it is to be understood that the present invention has been described by way of illustration and not limitation.

What is claimed is:

1. An apparatus for mounting a radio or equivalent accessory in a dashboard cavity of different automobiles comprising:
    a frame means defining a receptacle in which said radio or equivalent accessory is received, said frame means having at least a first peripheral exterior surface defining two or more groups of aperture locator means for indicating the location at which an aperture can be punched through;
    bracket means mountable to said frame means at a punched out aperture; and
    wherein each group of said aperture locator means is selected for a particular one of said automotive dashboard cavities with each aperture locator means of said group being at a specified location to pre-position said bracket means mounted to a punched out aperture at a specified location for mounting said frame means in said particular one of said automotive dashboard cavities.

2. The apparatus of claim 1 wherein said locator means comprises a substantially circular recess in said surface.

3. The apparatus of claim 2 wherein said substantially circular recess includes an indicia.

4. An apparatus for mounting a radio or equivalent accessory in dashboard cavities of different automobiles comprising:
    a frame means defining a receptacle in which said radio or equivalent accessory is received; and
    two or more groups of apertures formed through at least a first wall of said frame means to facilitate the mounting of one or more bracket means to said frame means, wherein each group of said apertures is specifically selected for a particular one of said automotive dashboards with each aperture of said aperture group being at a specified location to pre-position said bracket means mounted thereto at a specified location for mounting said frame means in said desired dashboard cavity.

5. An apparatus for mounting a radio in dashboard cavities of different automobiles comprising:
    a frame means including a front panel connecting four interconnected peripheral walls which form a substantially open ended box-like structure, said open end positioned opposite said front panel and through which said radio is received into said frame means, said front panel defining at least one opening to receive at least a part of said radio, at least a first peripheral wall having an exterior surface defining two or more groups of aperture locator means for indicating the location at which apertures can be punched through said peripheral wall
    mounting bracket means formed to be secured to said peripheral wall at a selected one of said apertures punched through said aperture locator means; and
    wherein each group of said aperture locator means is selected for a particular one of said automotive dashboard cavities with each aperture locator means of said group being at a specified location to pre-position said bracket means mounted to a punched out aperture at a specified location for mounting said frame means in said particular one of said automotive dashboard cavities.

6. The apparatus of claim 5 wherein said locator means comprises a recess formed in said peripheral wall.

7. The apparatus of claim 6 wherein said locator means possesses an indicia.

8. The apparatus of claim 6 wherein said recess is substantially circular and defined by an inwardly extending substantially circular peripheral surface connected to a substantially planar surface recessed in and defining a portion of said peripheral wall of a lesser thickness than the remainder of said peripheral wall.

9. The apparatus of claim 8 wherein said planar surface of said recess possesses an indicia.

10. The apparatus of claim 8 wherein two or more of said other peripheral walls define one or more locator means.

11. The apparatus of claim 10 wherein said locator means possess indicia.

12. The apparatus of claim 5 wherein said locator means comprises a recess formed in said peripheral wall, wherein said recess is defined by at least a first peripheral surface connected to an innermost surface, with said peripheral wall along said innermost surface being of a thickness to allow it to be punched through to cause said recess to define a substantially open aperture.

13. The apparatus of claim 12 wherein said recess is a substantially circular recess with said peripheral surface being substantially circular.

14. The apparatus of claim 13 wherein said innermost surface of said locator means possesses indicia.

* * * * *